United States Patent Office 3,544,611
Patented Dec. 1, 1970

3,544,611
PROCESS FOR THE PREPARATION OF
ORGANIC ISOCYANATES
Jean Michelet and Louis Alheritiere, Deux-Sevres, France, assignors to Societe Toulousaine de Produits Chimiques Tolochimie, Paris, France, a corporation of France
Filed Sept. 9, 1966, Ser. No. 578,417
Claims priority, application France, Dec. 27, 1965, 43,800; Apr. 13, 1966, 57,470, Patent 1,469,105
Int. Cl. C07c 119/04
U.S. Cl. 260—453       12 Claims

ABSTRACT OF THE DISCLOSURE

High pressure process for the production of saturated aliphatic or aromatic mono- or diisocyanates by reaction of corresponding amines with phosgene utilizing a large excess of phosgene.

---

Figure 1:
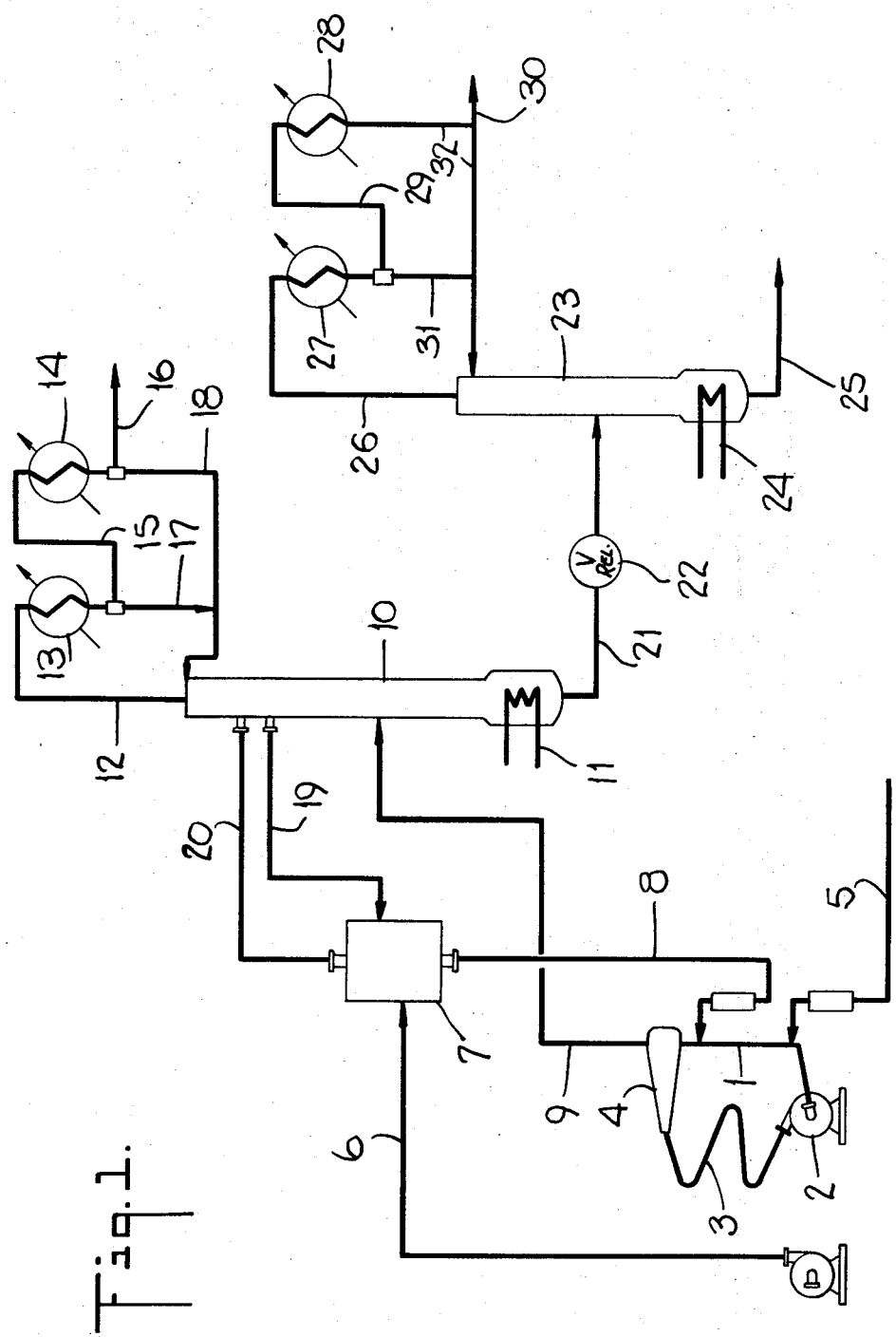

This invention relates to the production of organic isocyanates. More particularly it relates to the production of aromatic and aliphatic mono-, di- and polyisocyanates by a novel and facile process by which the desired compounds may be produced in yields as high as 90% or even higher.

Organic isocyanates comprise a large and useful class of organic compounds including aliphatic and aromatic mono-, di- and polyisocyanates. They have known applicability to the production of a variety of commercially useful products including, for example pharmaceuticals, foams, adhesives, protective coatings and elastomeric fibers. Organic diisocyanates such as 2,4- and 2,6-tolylene diisocyanate, 4,4'-diphenylmethane diisocyanate, 1,6-hexamethylene diisocyanate, 1,5-naphthalene diisocyanate, 3,3'-dimethoxy-4,4'-biphenyl diisocyanate, 3,3'-dimethyl-4,4'-biphenyl diisocyanate, 4,4'-biphenyl diisocyanate and various isomers of phenylene diisocyanates are especially useful for the production of known varieties of polyurethanes which are employed commercially as adhesives, protective coatings, flexible and rigid foams and elastomeric fibers.

It is known that organic isocyanates can be produced by the reaction of phosgene with the corresponding amines or salts thereof in the presence of an inert diluent. In French Pat. No. 1,126,440 it has been proposed to carry out the operation continuously with application of a high pressure in the first stage of the reaction.

As is well known the operation takes place in two successive steps or stages, the first one with formation of carbamyl chloride and the second one with decomposition of the carbamyl chloride into isocyanate, while all the chlorine of the reacted phosgene is finally converted into hydrogen chloride, as represented below:

(I)   R—NH$_2$+COCl$_2$⇌R—NH—COCl+HCl 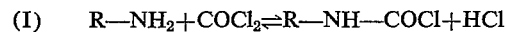

(II)   R—NH—COC⇌R—N=CO+HCl 

wherein R represents an aliphatic or aromatic radical which may contain for example up to 12 or more carbon atoms and may be unsubstituted or substituted with reaction inert substituents.

Reaction (I) can be carried out at a superatmospheric pressure. Obviously such increased pressure cannot exert any unfavorable action upon the evolution of reaction (I) from left to right since there is no change in volume of the gaseous components, COCl$_2$ and HCl. On the other hand, reaction (II) is normally carried out at atmospheric pressure (or at most under a slight overpressure not exceeding about 1–2 kg./cm.$^2$ effective) or even in vacuum to take advantage of the formation of the gaseous compound, HCl, from the carbamyl chloride to favor isocyanate formation.

Separation of the hydrogen chloride and phosgene from the raw reaction product and separate recovery of the phosgene ordinarily requires complex and expensive apparatus, whether the operation is carried out batchwise or continuously.

An object of the present invention is to improve the conversion of amines to isocyanates. Another object is to simplify the apparatus in which such conversion is carried out continuously.

A particular object of the invention is to provide a very high isocyanate yield while facilitating the separation of the hydrogen chloride and phosgene and ensuring an economical recovery thereof.

The invention, accordingly, comprises the novel processes and steps of processes specific embodiments of which are described herein by way of example and in accordance with which we now prefer to practice the invention.

In accordance with the invention one carries out at a high pressure, of at least 10 kg./cm.$^2$ effective, not only reaction (I) leading to carbamyl chloride formation, but also reaction (II) of carbamyl chloride decomposition giving the desired organic isocyanate and hydrogen chloride. Carrying out the second stage of the operation at such a high pressure increases the isocyanate yield, which is a surprising effect since one would theoretically expect that a large increase in pressure will cause reversal of reaction (II), thus retarding isocyanate formation.

It should be emphasized that carrying out the second stage of the operation at a high pressure minimizes the problems of separating the unconverted phosgene from the hydrogen chloride, as it is sufficient to cool the gases under pressure with tap water at ordinary temperature, to cause condensation of the greater part of the phosgene vapor. Of course this results in savings, and size diminution and simplification of the apparatus required. Moreover, the hydrogen chloride removed from the isocyanate production apparatus is substantially free of phosgene or other diluent which is an important advantage.

A further advantage is that carrying out the second stage of the operation at a high pressure leads to reaction mixtures containing higher isocyanate concentration. This also results in size diminution of the apparatus and reduction of the costs of recovering the isocyanates from such reaction mixtures, inasmuch as the operation at high pressure allows easy use of low boiling diluents which are easily separated from the isocyanates by simple distillation. Moreover, the method of the invention lends versatility to the isocyanate production plant by permitting variance at will of the operating conditions such as temperature, kind of diluent, concentrations and the like.

Figure 2:
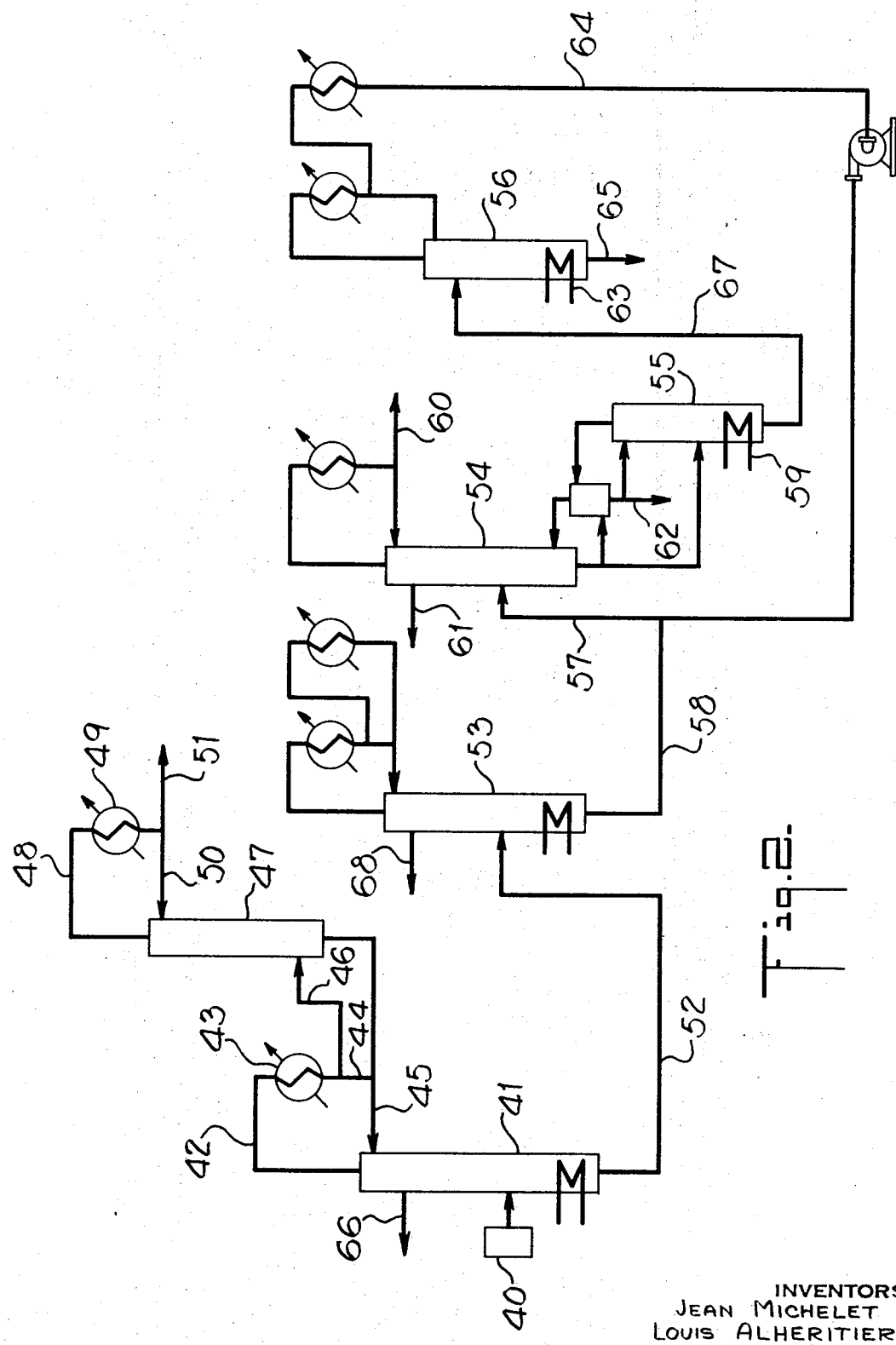

The following description, when taken together with the annexed FIGS. 1 and 2, will show our presently preferred manner of carrying out the process of the invention.

The amine and phosgene are fed continuously to the amine-phosgene reaction apparatus in which reaction (I) takes place. The amine may be fed in molten state or dissolved in a reaction inert organic diluent containing, for example up to twelve or more carbon atoms, more especially an ester such as di-ethyl, di-isopropyl, di-n-butyl or di-i-butyl phthalate; di-n-butyl or di-i-butyl adipate; methyl, ethyl, n-butyl or i-butyl n-butyrate or i-butyrate; 2-ethyl hexyl 2-ethyl hexanoate; a hydrocarbon such as toluene; a halogenated hydrocarbon such as monochlorobenzene or o-dichlorobenzene; or a ketone such as methyl isobutyl ketone and the like. For optimum yields, a large molar excess of phosgene is employed. Desirably an excess of from 100% or more, for example between 150% and 350% over the theoretical amount. The phosgene may be fed alone or in the form of a solution in the inert diluent chosen for the operation. The amine-phosgene reaction apparatus is maintained at a temperature of 40° to 120° C., preferably 80° to 115° C., and at an effective pressure of 10 to 50 kg./cm.²

In the plant represented in the annexed drawing, FIG. 1 the amine-phosgene reaction apparatus is mainly comprised by a reaction circuit comprising a pipe 1, a liquid circulation pump 2, a pipe 3 and a separator 4 (preferably a horizontal conical decanter). The amine is introduced by a pipe 5 into the pipe 1 of the circuit. The phosgene, fed to the plant by a pipe 6, is also introduced via a balance tank 7 and a pipe 8 into pipe 1. The diluent may be fed in the form of a solution of the amine and/or in the form of a solution of the phosgene. Alternatively it may be fed either separately, by a pipe (not shown) placed near pipe 5, or partly in the form of a solution of the amine and/or in the form of a solution of the phosgene and partly separately by the same pipe (not shown). When the amine or phosgene is fed in free state, this is done in the form of molten amine and liquid phosgene, respectively.

The rate of circulation of the reaction mixture through the circuit should be high. The rate of circulation is at least 10 times and at most 50 times, preferably 20 to 30 times, the total volume of reactants (including the diluent) fed to the circuit, per unit of time. Separator 4 permits easy removal from the circuit of the gaseous phase (hydrogen chloride) which may form under certain operating conditions, when the reaction mixture is hydrogen chloride-saturated, and which might decrease the efficiency of pump 2.

Per unit of time an amount of reaction mixture corresponding to the amount of reactants and diluent introduced during the same time is withdrawn from the circuit by a pipe 9 and is fed to the middle part of a distillation column 10, heated at its base, at 11, for example by indirect heat exchange with steam and in which takes place both reaction (II) and distillation of the final products. Column 10 is operated under a pressure of at least 10 kg./cm.² effective. Of course, it is advisable although not essential to operate this column under the same pressure as the reaction circuit. The temperature at the base of column 10 is maintained between 120° and 180° C., preferably between 130° and 145° C., on the one hand by passing a constant and sufficient amount of steam through heating device 11 so as to ensure decomposition of the carbamyl chloride in the column and separation of the hydrogen chloride and excess phosgene from the reaction mixture and on the other hand by suitably controlling the ratio of excess phosgene withdrawn from the column to phosgene refluxed to the column. The heat expense is ordinarily in the neighborhood of 2 kg. per kg. of isocyanate produced, but depends upon the excess of phosgene fed to the reaction circuit.

The liquid mixture withdrawn from the base of column 10 essentially consists of a mixture of isocyanate, diluent and phosgene. In the upper portion of the column, above the feed point, the separation of the hydrogen chloride from the excess phosgene takes place. Removal of the hydrogen chloride which issues from the head of column 10 by a pipe 12, is effected by partial condensation of the phosgene in a condenser 13 cooled with cold water, then condensation of the greatest possible part of the remaining phosgene in a condenser 14 connected with condenser 13 by a pipe 15 and cooled by means of brine. The temperature at the exit from condenser 14 is maintained as low as possible to avoid too high losses of phosgene through entrainment by the gaseous HCl. The hydrogen chloride is removed by a pipe 16. The products liquified in 13 and 14 are refluxed to the top of column 10 by pipes 17 and 18 respectively.

The excess phosgene recovered in the head part of column 10 from which it is withdrawn at a level somewhat below the top, is sent back by a pipe 19 to the balance tank 7 from which the reaction circuit receives the phosgene. A pipe 20 ensures communication between the atmosphere in the head part of column 10 and the atmosphere above the liquid phosgene in tank 7.

The mixture of isocyanate, diluent and phosgene withdrawn from the base of column 10 by a pipe 21 fitted with a release valve 22 is introduced into the middle part of a distillation column 23, heated at its base, at 24, by indirect heat exchange with steam and in which this mixture is rectified at atmospheric pressure or under a slight overpressure, preferably not above 5 kg./cm.² effective. The raw isocyanate and diluent are withdrawn from the base of column 23 by a pipe 25. Then the diluent is separated from the isocyanate and the latter is purified by conventional techniques.

Recovery of the phosgene which issues from the top of column 23 by a pipe 26 is effected by partial condensation in a condenser 27 cooled with cold water, then complementary condensation in a condenser 28 connected with condenser 27 by a pipe 29 and cooled by means of brine. The phosgene is withdrawn by a pipe 30 and sent back to the feeding means for the reaction circuit. The liquid condensed in 27 and part of the liquid condensed in 28 are refluxed to the top of column 23 by pipes 31 and 32 respectively.

Instead of the reaction circuit, 1, 2, 3, 4, there can be employed for carrying out the first stage of the operation a mixing apparatus of the venturi type such as described in French patent of addition No. 69,428.

It has been found that if the process of the invention is carried out at a pressure high enough it is possible to recover directly in liquid state the hydrogen chloride produced by the reaction. For this purpose the uncondensed vapors issued from the carbamyl chloride decomposition reaction zone are introduced into a separation zone in which the recovery of liquid hydrogen chloride from the gaseous hydrogen chloride can be effected by condensation thereof in a condensing device at the top of the column using cooling means currently available in a chemical factory, for example an ordinary brine of current cooling power or even only tap water if the pressure is sufficiently high. It is sufficient, for the purpose aimed at, that the operation be carried out under a pressure of at least 15 kg./cm.² effective and up to 50 kg./cm.² effective or even more. For example, under a pressure of 15 kg./cm.² effective the hydrogen chloride can be liquefied at a temperature a little above −20° C.; under a pressure of 33 kg./cm.² effective it can be liquefied at approximately +10° C.

FIG. 2 is a representation of an alternative apparatus provided with a column for the recovery of liquid hydrogen chloride which may be used in the practice of the invention and is especially suitable for use in conjunction with higher pressures and low-boiling diluents. In the apparatus of FIG. 2, element 40 represents the reaction system 1, 2, 3, 4 of FIG. 1 and column 41 corresponds to column 10 of FIG. 1.

The vapors issuing from the head portion of column 41 pass through a pipe 42 into a dephlegmator 43, cooled with water and in which the greater part of the entrained phosgene is liquefied, the liquid so produced being refluxed to the head portion of column 41 by pipes 44 and 45. Substantially pure phosgene is withdrawn from the upper portion of column 41 and recycled through pipe 66. The hydrogen chloride gas, still laden with phosgene vapors, is introduced by a pipe 46 into a small column 47 in which is effected separation from one another of the phosgene, which is withdrawn in liquid state from the base of column 47, and refluxed to the head portion of column 41 by pipe 45, and of the hydrogen chloride gas which is drawn off from the head portion of column 47 by a pipe 48 and is liquefied in a condenser 49 suitably cooled according to the operating pressure. A part of the pure liquid hydrogen chloride is refluxed to the head portion of column 47 by a pipe 50, the remainder being removed from the apparatus by a pipe 51.

In the process of the present invention in accordance with which high pressures are employed, it may be advantageous, as aforesaid, to use for the conversion of the amine into organic isocyanate an inert diluent having a low boiling point, which provides in the present process certain particular advantages. For example, because of the presence of a large excess of phosgene and of a low-boiling diluent, the temperature at the foot of column 41 can be comparatively low in spite of the high pressure prevailing in columns 41 and 42. A further advantages of the use of a low-boiling diluent is that it permits economical recovery of the phosgene in the column 53.

Isocyanate-diluent-phosgene mixture is withdrawn from the foot of column 41 by a pipe 52. Column 53 of the drawing corresponds to column 23 of FIG. 1. Economical recovery of the phosgene is made possible by the fact that column 53 is typically at a slight overpressure, of the order of 1–5 kg./cm.$^2$ effective, this being feasible because of the use of comparatively low-boiling diluents. By so operating it is possible to effect condensation of the phosgene, at the top of column 53, at a comparatively high temperature for example 30–40° C., thus without expense of cooling energy and only using tap water. The reaction being complete in column 41, there is no risk of any HCl being present in column 53 and capable of entraining, on issuing from the condensing devices at the top of column 53, a fraction of the phosgene in spite of the relatively high temperature of liquefaction of the latter under the overpressure prevailing in column 53. The phosgene recovered at the top of column 53 by a pipe 68 is substantially pure and can be directly re-used in amine-phosgene reaction device 40.

In accordance with the present invention there is also provided an improvement to the classical distillation system which permits complete separation and recovery of the low-boiling diluent. The system improved in accordance with the invention is essentially comprised by distillation columns 54, 55 and 56 of FIG. 2, and annexes thereof.

For carrying out the separation and recovery of the low-boiling diluent one introduces into the middle portion of column 54, by a pipe 57, the isocyanate-diluent mixture withdrawn from the base of column 53 by a pipe 58. In the unit essentially comprised by column 54 and column 55, which is heated by supply of heat, through 59, to the base of column 55, there is separated a slight amount of low-boiling impurities, withdrawn by a pipe 60, and the major part of the low-boiling diluent, withdrawn partly from the top of column 54 by a pipe 61, partly from the top of column 55 by a pipe 62. Column 55 is operated at a pressure above that prevailing in column 54, so that the vapors of diluent which distill off from the top of column 55 can ensure heating of column 54. Such a "double acting" distillation permits using only half of the amount of heat which would be needed for recovery of the low-boiling diluent in a "simple acting" column being employed in lieu of the two columns, 54 and 55. For example it is possible to operate column 54 under a slight vacuum (absolute pressure, below 300 mm. mercury) and column 55 at atmospheric pressure, or alternatively to operate column 54 at atmospheric pressure and column 55 at a slight overpressure, advantageously of the order of 1 kg./cm.$^2$ effective.

Column 56, which is fed by pipe 67 with the product from the base of column 55 and is heated at its base, through 63, serves to separate, as a head product, the last traces of the low-boiling diluent which are sent back to column 54 by pipes 64 and 57 and, as a tail product, withdrawn by a pipe 65, the isocyanate containing the high boiling by-products from its production. As column 56 contains substantially no low-boiling diluent, it is recommended to operate it under a stronger vacuum than column 54, preferably below 100 mm. mercury, in order that the boiling temperature at the base of column 56 is not too high.

The following, non-limiting examples illustrate the process of this invention.

EXAMPLE 1

The reaction circuit, of a total volume of 15 liters (FIG. 1), is continuously fed with 94 kg./hr. of a 12.75% solution of tolylene diamine in i-butyl-i-butyrate and 48.6 kg./hr. of liquid phosgene, i.e. an excess of phosgene of 150% with respect to the theoretical amount. The rate of circulation of the liquids through the circuit amounts, per hour, to 20 times the total volume of liquids fed during the same time. The temperature in the circuit is maintained at 110° C. and the pressure is 15 kg./cm.$^2$ effective.

142.6 kg./hr. of reaction mixture is withdrawn from the circuit by pipe 9 and introduced into column 10 which is 1.5 meters high, has an internal diameter of 35 cm. and is filled with Raschig rings. 33 kg./hr. of heating steam is fed to the base of column 10. The base temperature in this column is 145° C. and the head temperature is 82° C. The pressure in the column is 15 kg./cm.$^2$ effective.

From the top of column 10 the hydrogen chloride still containing a low proportion of phosgene (2.5 moles per 100 moles of HCl) is withdrawn by pipe 16 after passing through condenser 13, cooled to 20° C. by tap water, then through condenser 14, cooled to −20° C. by means of brine. There is so removed 14.34 kg./hr. of hydrogen chloride laden with 0.972 kg. of phosgene.

About 8 kg./hr. of substantially pure phosgene is withdrawn by pipe 19 and sent back to tank 7.

The mixture removed from the foot of column 10 by pipe 21 contains:

| | Kg./hr. |
|---|---|
| Tolylene diisocyanate | 16.5 |
| i-Butyl i-butyrate | 82 |
| Phosgene | 20.2 |

The diisocyanate obtained is a mixture of 80% of 2,4-tolylene diisocyanate and 20% of 2,6-tolylene diisocyanate.

The liquid mixture removed from the foot of column 10 is introduced into column 23, by pipe 21, after release in release valve 22. Column 23 is operated at atmospheric pressure. Its base temperature is 158° C. and its head temperature is about 7° C. The solution of tolylene diisocyanate (16.5 kg./hr.) of the diluent (82 kg./hr.) is removed by pipe 25, then treated in accordance with conventional techniques to recover pure diisocyanate therefrom.

The yield is 96.6%.

From the top of column 23, by pipe 30, there is withdrawn 20.2 kg./hr. of phosgene after condensation of the vapors thereof in condenser 27, cooled to 4–5° C. by icy water, then in condenser 28, cooled to −20° C. by means of brine.

EXAMPLE 2

The operation is carried out in the apparatus of Example 1. The reaction circuit is continuously fed with 58.3 kg./hr. of a 25% solution of tolylene diamine in diethyl i-phthalate and 94.6 kg./hr. of phosgene, i.e. an excess of phosgene of 300% with respect to the theoretical amount. The rate of circulation of the liquids through the circuit amounts, per hour, to 20 times the total volume of liquids fed during the same time. The temperature in the circuit is maintained at 85° C. and the pressure is 15 kg./cm.$^2$ effective.

152.9 kg./hr. of reaction mixture is withdrawn from the circuit by pipe 9 and introduced into column 10 to the base of which is fed 40 kg./hr. of heating steam. The base temperature in this column is 137° C. and the head temperature is 82° C. The pressure in the column is 15 kg./cm.$^2$ effective.

From the top of column 10 there is withdrawn by pipe 16, after passage through condensers 13 and 14 cooled as specified in the foregoing example, 17.44 kg./hr. of hydrogen chloride laden with 1.18 kg./hr. of phosgene.

51.87 kg./hr. of substantially pure phosgene is withdrawn by pipe 19 and sent back to tank 7.

The mixture removed from the foot of column 10 by pipe 21 contains:

|  | Kg./hr. |
|---|---|
| Tolylene diisocyanate | 20 |
| Diethyl i-phthalate | 43.7 |
| Phosgene | 17.9 |

The diisocyanate obtained has the same composition as in Example 1.

The mixture withdrawn by pipe 21 is distilled in column 23 then treated by conventional techniques, as indicated in Example 1, to separate and recover the phosgene, diisocyanate and diluent therefrom.

The yield is 96.2%.

EXAMPLE 3

The operation is carried out in the apparatus of Example 1. The reaction circuit is continuously fed with 126 kg./hr. of a 10% solution of 4,4'-diamino diphenyl methane in o-dichlorobenzene and 48 kg./hr. of phosgene, i.e. an excess of phosgene of 280% with respect to the theoretical amount. The rate of circulation of the liquids through the circuit amounts, per hour, to 20 times the total volume of liquids fed during the same time. The temperature in the circuit is maintained at 95° C. and the pressure is 15 kg./cm.$^2$ effective.

174 kg./hr. of reaction mixture is withdrawn from the circuit by pipe 9 and introduced into column 10 to the base of which is fed 30 kg./hr. of heating steam. The base temperature in this column is 142° C. and the head temperature is 82° C. The pressure in the column is 15 kg./cm.$^2$ effective.

From the top of column 10 there is withdrawn by pipe 16, after passage through condensers 13 and 14 cooled as specified in Example 1, about 9.3 kg./hr. of hydrogen chloride laden with 0.63 kg./hr. of phosgene.

4.54 kg./hr. of substantially pure phosgene is withdrawn by pipe 19 and sent back to tank 7.

The mixture removed from the foot of column 10 by pipe 21 contains:

|  | Kg./hr. |
|---|---|
| Diphenyl methane 4,4'-diisocyanate | 14.9 |
| o-Dichlorobenzene | 113.4 |
| Phosgene | 30.2 |

The mixture withdrawn by pipe 21 is distilled in column 23 then treated by conventional techniques, as indicated in Example 1, to separate and recover the phosgene, diisocyanate and diluent therefrom.

The yield is 94%.

EXAMPLE 4

The operation is carried out in an apparatus analogous to that of Example 1 except that the total volume of the reaction circuit is only 2.5 liters. The circuit is continuously fed with 88 kg./hr. of a 20.45% solution of aniline in diethyl i-phthalate and 77 kg./hr. of phosgene, i.e. an excess of phosgene of 300% with respect to the theoretical amount. The rate of circulation of the liquids through the circuit amounts, per hour, to 25 times the total volume of liquids fed during the same time. The temperature in the circuit is maintained at 80° C. and the pressure is 15 kg./cm.$^2$ effective.

165 kg./hr. of reaction mixture is withdrawn from the circuit by pipe 9 and introduced into column 10 which has the same size as that in Example 1 and to the base of which is fed 43 kg./hr. of heating steam. The base temperature in this column is 145° C. and the head temperature is about 80° C. The pressure in the column is 15 kg./cm.$^2$ effective.

From the top of column 10 there is withdrawn by pipe 16, after passage through condensers 13 and 14, cooled as specified in the foregoing examples, 14 kg./hr. of hydrogen chloride laden with 0.95 kg./hr. of phosgene.

30 kg./hr. of substantially pure phosgene is withdrawn by pipe 19 and sent back to tank 7.

The mixture removed from the foot of column 19 by pipe 21 contains:

|  | Kg./hr. |
|---|---|
| Phenyl isocyanate | 21.65 |
| Diethyl i-phthalate | 70 |
| Phosgene | 27 |

The mixture withdrawn by pipe 21 is distilled in column 23 then treated by conventional techniques, as indicated in Example 1, to separate and recover the phosgene, isocyanate and diluent therefrom.

The yield is 95%.

EXAMPLE 5

The operation is carried out in the apparatus of Example 1. The reaction circuit is continuously fed with 120 kg./hr. of a 10% solution of 4,4'-diamino diphenylmethane in toluene and 54 kg./hr. of phosgene, i.e. an excess of phosgene of about 350% with respect to the theoretical amount. The rate of circulation of the liquids through the circuit amounts, per hour, to 15 times the total volume of liquids fed during the same time. The temperature in the circuit is maintained at 65° C. and the pressure is 12 kg./cm.$^2$ effective.

174 kg./hr. of reaction mixture is withdrawn from the circuit by pipe 9 and introduced into column 10 to the base of which is fed 45 kg./hr. of heating steam. The base temperature in this column is 132° C. and the head temperature is 75° C. The pressure in the column is 12 kg./cm.$^2$ effective.

From the top of column 10 there is withdrawn by pipe 16, after passage through condensers 13 and 14, cooled as specified in the foregoing examples, 8.85 kg./hr. of hydrogen chloride laden with 0.6 kg./hr. of phosgene.

18.8 kg./hr. of substantially pure phosgene is withdrawn by pipe 19 and sent back to tank 7.

The mixture removed from the foot of column 10 by pipe 21 contains:

|  | Kg./hr. |
|---|---|
| Diphenylmethane 4,4'-diisocyanate | 14.4 |
| Toluene | 108 |
| Phosgene | 22.6 |

This mixture is introduced into column 23, by pipe 21, after partial release in release valve 22. Column 23 is operated under a pressure of 1.5 kg./cm.$^2$ effective. Its base temperature is 150° C. and its head temperature is 31° C. For the rest, column 23 is operated substantially as described in Example 1.

The yield is 95%.

EXAMPLE 6

The operation is carried out in an apparatus similar to that of Example 1 except that a release valve (not shown in the drawing) is inserted in pipe 9, column 10 being operated at a pressure different from that prevailing in the reaction circuit.

The reaction circuit is continuously fed with 120 kg./hr. of a 9% solution of hexamethylene diamine in diethyl i-phthalate and 92.5 kg./hr. of phosgene, i.e. an excess of phosgene of about 400% with respect to the theoretical amount. The rate of circulation of the liquids through the circuit amounts, per hour, to 20 times the total volume of liquids fed during the same time. The temperature in the circuit is maintained at 135° C. and the pressure is 20 kg./cm.$^2$ effective.

212.5 kg./hr. of reaction mixture is withdrawn from the circuit by pipe 9, partially released in the release valve inserted in this pipe, and introduced into column 10 to the base of which is fed 45 kg./hr. of heating steam. The pressure in column 10 is 15 kg./cm.$^2$ effective. The base temperature in this column is about 155–160° C. and the head temperature is 80° C.

From the top of column 10 there is withdrawn by pipe 16, after passage through condensers 13 and 14, cooled as specified in the foregoing examples, 13.6 kg./hr. of hydrogen chloride laden with 0.91 kg./hr. of phosgene.

29.66 kg./hr. of substantially pure phosgene is withdrawn by pipe 19 and sent back to tank 7.

The mixture removed from the foot of column 10 by pipe 21 contains:

| | Kg./hr. |
|---|---|
| Hexamethylene diisocyanate | 14.1 |
| Diethyl i-phthalate | 110.5 |
| Phosgene | 33 |

This mixture is distilled in column 23 then treated by conventional techniques, as indicated in Example 1.

The yield is about 90%.

EXAMPLE 7

The operation is carried out in the apparatus of Example 4. The reaction circuit is continuously fed with 112.5 kg./hr. of a 24% solution of m-chloraniline in diethyl isophthalate and 59 kg./hr. of phosgene, i.e. an excess of phosgene of 180% with respect to the theoretical amount. The rate of circulation of the liquids through the circuit amounts, per hour, to 25 times the total volume of liquids fed during the same time. The temperature in the circuit is maintained at 90° C. and the pressure is 15 kg./cm.$^2$ effective.

171.5 kg./hr. of reaction mixture is withdrawn from the circuit by pipe 9 and introduced into column 10 which has the same size as that in Example 1 and to the base of which is fed 38 kg./hr. of heating steam. The base temperature in this column is 145° C. and the head temperature is 80° C. The pressure in the column is 15 kg./cm.$^2$ effective.

From the top of column 10 there is withdrawn by pipe 16, after passage through condensers 13 and 14, cooled as specified in the foregoing examples, 14.5 kg./hr. of hydrogen chloride laden with 1 kg./hr. of phosgene.

13 kg./hr. of substantially pure phosgene is withdrawn by pipe 19 and sent back to tank 7.

The mixture removed from the foot of column 10 by pipe 21 contains:

| | Kg./hr. |
|---|---|
| m-Chlorphenyl isocyanate | 30.8 |
| Diethyl isophthalate | 85.5 |
| Phosgene | 25 |

This mixture is distilled in column 23 then treated by conventional techniques, as indicated in Example 1.

The yield is 95%.

EXAMPLE 8

The operation is carried out in an apparatus similar to that of Example 1. The reaction circuit is continuously fed with 1540 kg./hr. of a 14.3% solution of tolylene diamine in diethyl isophthalate and 1680 kg./hr. of phosgene, i.e. an excess of phosgene of 315% with respect to the theoretical amount. The rate of circulation of the liquids through the circuit amounts, per hour, to 20 times the total volume of liquids fed during the same time. The temperature in the circuit is maintained at 85° C. and the pressure is 15 kg./cm.$^2$ effective.

3220 kg./hr. of reaction mixture is withdrawn from the circuit by pipe 9 and introduced into column 10 to the base of which is fed 800 kg./hr. of heating steam. The base temperature in this column is 136° C. and the head temperature is 86° C. The pressure in the column is 15 kg./cm.$^2$ effective.

From the top of column 10 there is withdrawn by pipe 16, after passage through condensers 13 and 14, cooled as specified in the foregoing examples, 321.5 kg./hr. of hydrogen chloride laden with 21.8 kg./hr. of phosgene.

799.2 kg./hr. of substantially pure phosgene is withdrawn by pipe 19 and sent back to tank 7.

The mixture removed from the foot of column 10 by pipe 21 contains:

| | Kg./hr. |
|---|---|
| Tolylene diisocyanate | 325.3 |
| Diethyl isophthalate | 1320 |
| Phosgene | 456 |

This mixture is distilled in column 23 then treated by conventional techniques, as indicated in Example 1.

The yield is 99.8%.

EXAMPLE 9

The phosgene-amine reaction is effected starting from tolylene diamine (a mixture of 80% by weight of the 2,4-isomer and 20% by weight of the 2,6-isomer) and using toluene as a diluent, in the apparatus of FIG. 2 using as reactor 40 the reactor of Example 1, the particular operating conditions being as follows:

Feed per hour:
    Tolylene diamine—10.8 kg.
    Phosgene—192.5 kg. (i.e., an excess of 1000%)
    Diluent (toluene)—133 kg.
Temperature in reactor 40—80° C.
Pressure in reactor 40—35 kg./cm.$^2$ effective.

The unit comprised by the column 41 and the small column 47 is operated, as is the reactor 40, under a pressure of 35 kg./cm.$^2$ effective. Under this pressure the hydrogen chloride gas leaving the top of column 47 at a temperature of 12° C. is easily liquefied by cooling in condenser 49 by means of an ordinary brine system. By pipe 51 there is withdrawn 12.4 kg./hr. of pure liquid hydrogen chloride. By pipe 66 there is withdrawn from the upper portion of column 41 25 kg./hr. of pure phosgene which is sent back to the phosgene-amine reaction zone. From the base of column 41, the temperature of which is 170° C., there is withdrawn, per hour, a mixture of:

| | Kg. |
|---|---|
| Tolylene di-isocyanate | 14.8 |
| Phosgene | 150 |
| Toluene | 133 |

Column 53 is operated under a pressure of 2 kg./cm.$^2$ effective. From its top, from which the head vapors issue at a temperature of 40° C. and can be easily liquefied, there is withdrawn, by pipe 68, 150 kg./hr. of pure phosgene which is sent back to the phosgene-amine reaction zone. From the base of column 63, the temperature of which is 158° C., there is withdrawn by pipe 58, per hour, a mixture of:

| | Kg. |
|---|---|
| Tolylene di-isocyanate | 14.8 |
| Toluene | 133 |

Column 54 is operated under an absolute pressure of 200 mm. mercury. Its top portion is at a temperature of 70° C. and by pipe 61 there is withdrawn 65 kg./hr. of toluene therefrom. The base of column 54 is heated by the vapors at a temperature of 115° C. issued from the top of the column 55 which is operated at atmospheric pressure. 65.4 kg./hr. of toluene is withdrawn by pipe 62 and a mixture of:

| | Kg. |
|---|---|
| Tolylene di-isocyanate | 14.8 |
| Toluene | 2.6 | is withdrawn per hour from the base of column 55 and introduced by pipe 67 into the upper portion of column 56.

Column 56 is operated under an absolute pressure of 10 mm. mercury. The toluene vapors which, under this pressure, can be liquefied at a temperature of 6° C. are separated by dephlegmation in the brine-cooled condenser. 2.6 kg./hr. of toluene containing a small amount of tolylene di-isocyanate is withdrawn from this condenser and sent back by pipes 64 and 57 to the feed point of column 54. From the base of column 56, the temperature of which is 150° C., there is withdrawn 14.8 kg./hr. of tolylene di-isocyanate, representing a yield of 96%.

Of course, the di-isocyanate produced may be either employed as such, or subjected to further purification if desired.

It is also possible to operate at a pressure well below 35 kg./cm.$^2$ effective in column 41 and 47 and consequently diminish the excess amount of phosgene to be brought into play, but this results in an increase of costs for liquefying the hydrogen chloride gas at the top of column 47.

What is claimed is:

1. A two stage process for the continuous production of saturated aliphatic or aromatic mono- or diisocyanates which comprises:
   (1) mixing reactants comprising the corresponding aliphatic or aromatic primary mono- or diamine with a molar excess of at least 100% of phosgene, said mixing occurring in the presence of an inert low boiling diluent in a reaction zone maintained at a temperature of from about 40 to 120° C. and an effective pressure of from about 10 to 50 kg./cm.$^2$;
   (2) passing the resulting reaction mixture, in an amount corresponding to that of the reactants fed during the same time period, and containing excess unreacted phosgene, inert low boiling diluent and carbamyl chloride from said reaction zone into an intermediate portion of an elongated distillation zone, the pressure in said distillation zone being from about 10 kg./cm.$^2$ to about 50 kg./cm.$^2$ effective;
   (3) supplying heat to one end of said distillation zone so as to maintain said end at a temperature of from about 120 to 180° C. whereby said carbamyl chloride is decomposed;
   (4) withdrawing from said heated end of said distillation zone a liquid stream consisting essentially of a mixture containing inert diluent, unreacted phosgene and isocyanate;
   (5) withdrawing from the end of said distillation zone opposite said heated end a vaporous stream consisting essentially of unreacted phosgene and hydrogen chloride;
   (6) refluxing at least a part of the liquid phosgene recovered from the vaporous stream of step (5) to said distillation zone;
   (7) distilling off the low boiling diluent from the diluent, unreacted phosgene, and isocyanate mixture of step (4) in a system of three distillation columns comprising a first column which is operated at atmospheric pressure or under a slight vacuum and is fed with said isocyanate-diluent mixture and separates therefrom, as head products, the present low boiling impurities and the diluent, said first column being heated at its base by the head vapors from a second column which is fed with the tail product from said first column, said second column being operated under an absolute pressure of from 1 to 5 kg./cm.$^2$, being heated at its base and separating from the isocyanate the major part of the remaining diluent which is withdrawn therefrom as a head product; distilling in a third column the tail product from said second column, said third column being operated at a pressure lower than that prevailing in said first column, being heated at its base and separating from the isocyanate the remainder of the diluent, which is sent back to said first column.

2. A process as in claim 1 in which the amine reactant is a mixture of 2,4- and 2,6-tolylene diamine and the product produced is a mixture of 2,4- and 2,6-tolylene diisocyanate.

3. A process as in claim 1 in which the amine reactant is 4,4'-diamino diphenyl methane and the product produced is 4,4'-diphenyl methane diisocyanate.

4. A process as in claim 1 in which the amine reactant is aniline and the product produced is phenyl isocyanate.

5. A process as in claim 1 in which the amine reactant is hexamethylene diamine and the product produced is hexamethylene diisocyanate.

6. A process as in claim 1 in which the amine reactant is m-chloraniline and the product produced is m-chlorphenyl isocyanate.

7. A process as in claim 1 in which the reaction zone and the distillation zone are at the same pressure.

8. A process as in claim 1 in which the reaction zone is at a temperature of from 80 to 115° C.

9. A process as in claim 1 in which the distillation zone is at a temperature of from 130–145° C.

10. A process as in claim 1 in which said first column is operated under an absolute pressure below 300 mm. mercury and said third column is operated under an absolute pressure below 100 mm. mercury.

11. A process as in claim 1 which further comprises the steps of introducing said vaporous stream from step (5) consisting essentially of unreacted phosgene and hydrogen chloride into a separation zone maintained at a pressure substantially the same as the pressure in said distillation zone.

12. A process as in claim 11 which further comprises the steps of separately recovering from said separation zone a liquid stream consisting essentially of phosgene and a liquid stream consisting essentially of hydrogen chloride.

References Cited

UNITED STATES PATENTS

| 2,642,449 | 6/1953 | Morningstar et al. | 260—453 |
| 2,822,373 | 2/1958 | Beck | 260—453 |
| 3,226,410 | 12/1965 | Hettich et al. | 260—453 |
| 3,287,387 | 11/1966 | Denton et al. | 260—453 |

CHARLES B. PARKER, Primary Examiner

D. H. TORRENCE, Assistant Examiner

U.S. Cl. X.R.

203—78, 80